Oct. 28, 1952  J. G. IMPARATO  2,615,220
DRUM CLAMP DEVICE
Filed May 23, 1950
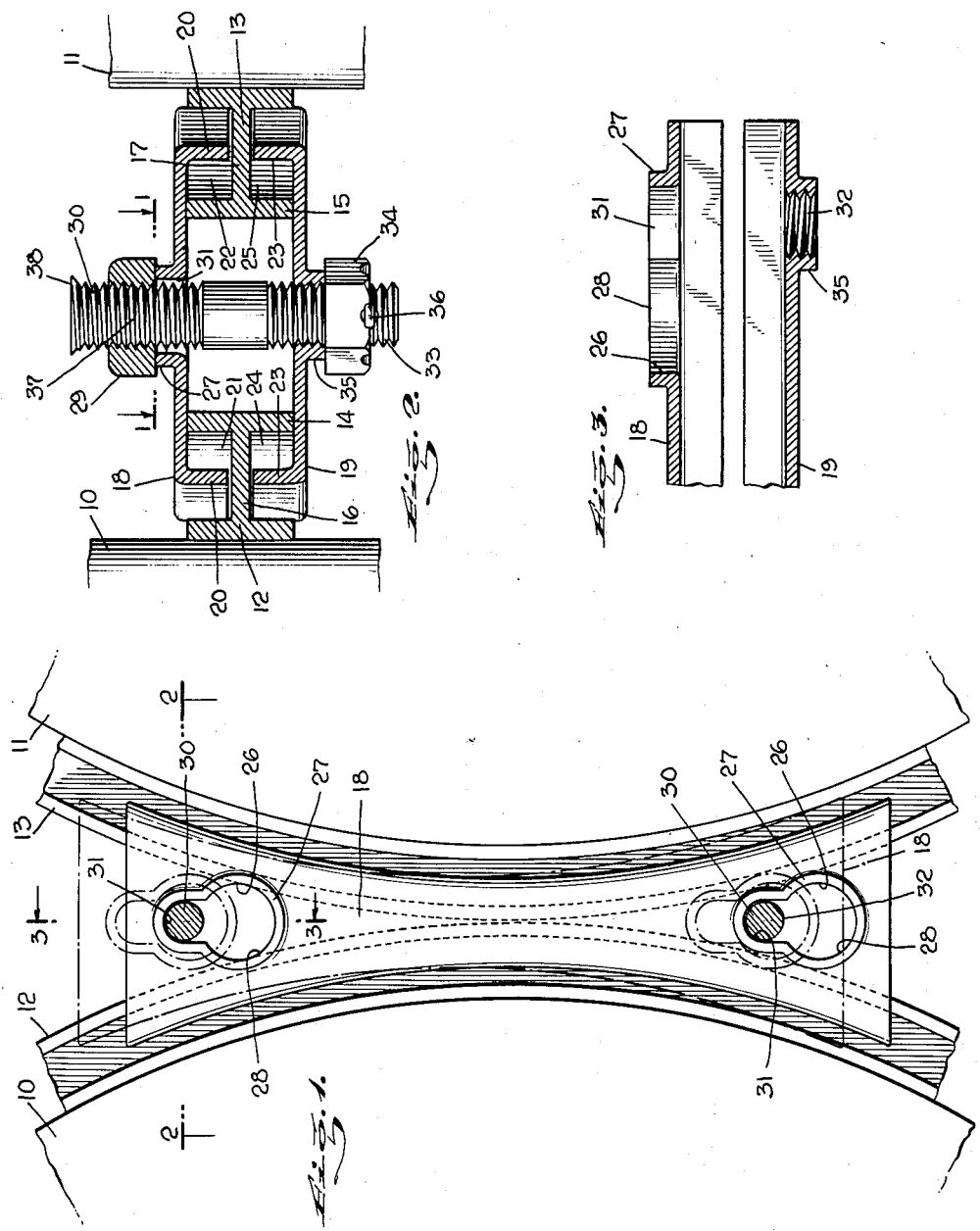
INVENTOR
JACK G. IMPARATO
BY
*Howard E. Thompson*
ATTORNEY Patented Oct. 28, 1952

2,615,220

UNITED STATES PATENT OFFICE 2,615,220

DRUM CLAMP DEVICE

Jack G. Imparato, Brooklyn, N. Y.

Application May 23, 1950, Serial No. 163,695

2 Claims. (Cl. 24—81)

This invention relates to devices for use in clamping oil drums and the like together in storage of the same on board ship and on other means of transportation to retain the drums against relative movement one with respect to the other. More particularly, the invention deals with a clamp, wherein one plate supports a pair of coupling bolts and the other plate is fashioned to receive the nut of the bolts and is shifted relatively to the first plate in alining the plates for clamping engagement with a pair of drums.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a plan view of a portion of two drums showing my clamp plates arranged thereon, the structure being partially in section as indicated by the section line 1—1 of Fig. 2.

Fig. 2 is a section on the line 2—2 of Fig. 1 on an enlarged scale, illustrating the parts in assembled relationship; and Fig. 3 is a section on the line 3—3 of Fig. 1, but omitting the clamp bolt normally fixed against displacement from the lower plate.

In the accompanying drawing, I have indicated at 10 and 11 parts of two drums having the annular T-rings 12 and 13 thereon, the crossheads of these T's being shown at 14 and 15 clearly in Fig. 2 and the other horizontal portions thereof at 16 and 17.

At 18 and 19 are shown the top and bottom plates of my improved clamp device. The top plate has inturned or downwardly turned curved side flanges, as at 20, of the general contour illustrated in Fig. 1, to fit in the upper channels 21 and 22 of the rings 12 and 13. The bottom plate 19 has similar upwardly turned flanges 23, which fit in the lower channels 24 and 25. The flanges 23 are curved to conform with the flanges 20. The curvature of the flanges 20 and 23 form wide end portions on the plates and the wide end portions of the top plate 18 have substantially keyhole apertures, as seen at 26, these apertures being bordered by raised flanges 27 for reinforcement of the plates.

The large openings 28 of the apertures 26 are sufficiently large to receive clamp nuts 29 arranged on bolts 30, one of which is seen in Fig. 2; whereas, the smaller diameter openings 31 of the apertures 26 are sufficiently large to freely receive the bolts 30, as is illustrated in Fig. 1.

The plate 19 has, in alinement with the small diameter portions 31 of the apertures 26, threaded apertures 32, that is to say, when the plates 18 and 19 are in normal alinement with each other, as indicated in Fig. 3 of the drawing and shown in full lines in Fig. 1. The threaded apertures 32 receive the lower threaded portions 33 of the bolts 30 and nuts 34 are arranged upon the threaded portions 33 to clamp the bolts in firm engagement on the plates 19. The apertures 33 are bordered by flanges, as at 35, to strengthen the plate 19 and to provide a longer thread in the plate. The nuts 34 are preferably of the lock nut-type having notches for reception of cotter pins 36 passed through the bolts 30 as is well-known in the art. The upper threaded end 37 of the bolts has its end peened-over as seen at 38 to prevent displacement of the nuts 29. In the construction shown, only one bolt structure is shown in detail. However, it will be apparent that both bolts employed will be of the same construction.

With my improved clamp device, it will be understood that, with the nuts 39 in a loosened position, the plates 18 and 19 are clamped together by first passing the bolts 30 with the nuts 29 thereon through the large portions 28 of the apertures 26, in other words, with the upper plate 18 in the dot-dash position illustrated in Fig. 1; after which, this plate is moved into the full line position to bring the bolts 30 in the small openings 31, after which the nuts 29 are tightened, thus clamping the plates upon the rings 12, 13 or the cross-head portions 14 and 15 thereof in the manner illustrated in Fig. 2 of the drawing.

Having fully described my invention, what I claim as new and desire to secure by Letters Patent is:

1. A clamp device for clamping T-ring portions of drums in abutting relationship to each other to retain the drums against relative movement with respect to each other, said device comprising a pair of substantially similar plates having contracted central portions and flared end portions, side edges of each of the plates having inturned flanges, the flanges of one plate being in common alinement with the flanges of the companion plate in clamping T-rings of a pair of drums together in abutting relationship with said T-rings housed within channels of said plates defined by said flanges, end portions of one plate having bolts projecting from inner surfaces of said plate, the other of said plates having, within said flared end portions, registering large and small diameter apertures, through which said bolts are adapted to pass, raised reinforcing walls completely bordering said apertures, nuts on said bolts adapted to pass freely through the large apertures of the last named plate in detachably coupling said plates, and said nuts engaging the reinforcing walls around the small apertures in clamping the plates together and on the T-rings of a pair of drums.

2. A clamp device for securing T flanges of drums in abutting engagement and against relative movement, said device comprising a pair of plates having wide end portions and a central contracted portion, side edges of the plates having alined flanges directed toward each other, the wide end portions of one plate having bolts with ends projecting in the direction of the flanges of said plate, the wide end portion of the other plate having keyhole-type of openings defined by registering large and small diameter apertures, in which the bolt ends are movable, nuts on said bolt ends adapted to pass freely through the large diameter apertures in assembling the plates on the T flanges of a pair of drums with the plates offset with respect to each other, said second named plate having raised walls bordering large and small diameter apertures, said nuts engaging the raised walls with the plates arranged in alinement and housing said abutting T-flanges in securely holding a pair of drums against relative movement, and means retaining the nuts against displacement from said bolts to maintain the bolts as part of the bolt plate facilitating coupling and uncoupling with respect to the apertured plate.

JACK G. IMPARATO.

REFERENCES CITED

The following references are of record in the file of this patent:

UNITED STATES PATENTS

| Number | Name | Date |
|---|---|---|
| 727,913 | Dixon et al. | May 12, 1903 |
| 1,440,613 | Mathias | Jan. 2, 1923 |
| 1,562,612 | Benjamin | Nov. 24, 1925 |
| 1,712,226 | Padesky | May 7, 1929 |
| 1,834,495 | Morse | Dec. 1, 1931 |
| 2,105,213 | Clark | June 11, 1938 |
| 2,384,112 | Meyer | Sept. 4, 1945 |
| 2,483,038 | Curtis | Sept. 27, 1949 |